UNITED STATES PATENT OFFICE.

LEWIS J. COX, OF TERRE HAUTE, INDIANA.

IMPROVEMENT IN PROCESSES OF DISINTEGRATING GRAIN.

Specification forming part of Letters Patent No. 222,674, dated December 16, 1879; application filed October 6, 1879.

*To all whom it may concern:*

Be it known that I, LEWIS J. COX, of Terre Haute, in the county of Vigo and State of Indiana, have invented or discovered certain Improvements in the Art of Reducing Corn and other substances to an Impalpable Paste or Pulp; and I hereby declare that the following is a full, clear, and exact description thereof sufficient to enable others skilled in the art to practice the invention.

This process is adapted to the reduction to impalpable paste or pulp of any starch-bearing grains or vegetables, but is intended especially for the reduction of maize or Indian corn and other grain for distillation.

I place the corn, without washing or other preliminary treatment, in any suitable close vessel, along with water, preferably sufficient to cover the grain. The vessel being closed heat is applied until a pressure is attained within the vessel of thirty to forty-five pounds to the inch, or steam may be introduced from an adjacent boiler, which heat and pressure are maintained until the grain is thoroughly permeated and softened or cooked. This can be determined by opening a discharge-valve of any proper construction, through which the pressure will force the grain or other material being operated upon. If the material discharged is sufficiently prepared it will, upon being discharged from the vessel and relieved from pressure, be converted into an impalpable paste.

The length of time during which the heat and pressure should be continued will be found to vary with different materials, and even with the same materials under different conditions, depending, as for one example, in the case of corn, upon the dryness thereof, so that it will be advisable to make frequent tests while treating the first vessel full of any particular material, noting the time and pressure, after which, having obtained the requisite data, it will be easy to treat subsequent charges without such tests or close watching. I find three or four hours at a steam-pressure of thirty to forty-five pounds proves sufficient to soften or treat ordinary maize, so that when discharged it will convert itself into thin paste, the tenuity of which will depend on the amount of water used in preparing the grain for explosion. If the heat and pressure are continued too long the material is liable to be discolored and injured.

When the grain or other material is sufficiently steamed it is suddenly discharged from the vessel into the air or into some open vessel, preferably a mash-tub, and it will be found, by the sudden removal of the pressure that had been maintained in the close vessel upon the substance, that when discharged each kernel or piece will be found reduced to fine particles or impalpable powder, which, with the water, forms a product like thin paste or thick soup, and ready for the next step in the process of distillation, or such other use as it may be desired to put it to. When the product is to be distilled I prefer to retain the hulls or skins of grain in the paste as they rise in the fermenting-tub, and form a top coating, which, in a measure, protects the mash from the atmosphere, and dispenses with the use of oats or other grain for this purpose.

I have found an apparatus very convenient for effecting the process described may consist of a vertical boiler, shaped like a common soda-fountain, with a feed-opening at its upper end, adapted to be closed conveniently in a steam-tight manner, and also a vertical stirrer-shaft protruding through the top, so as to be connected with driving-power, although this stirrer may be dispensed with when small quantities of grain are to be heated at once. I also tap into this boiler a steam-pipe for cooking with perforations opening preferably in the lower part of the boiler; also, in the extreme lower part of the boiler an exit-pipe of sufficient size to admit of a discharge of the contents of the boiler almost instantly, and placed in this exit-pipe close to the bottom of the boiler any ordinary valve with a stem leading out through the exit-pipe so that it can be opened readily and instantly; but while I prefer the apparatus thus described, I am satisfied that my process may be used with apparatus of quite different construction and arrangement of parts.

It is not essential to the reduction of grain by my process that the kernels should be whole, as it works well with broken or ground articles.

I am aware that corn has been heretofore cooked in steam-tight vessels under pressure. I do not, therefore, claim this part of my process separately.

I am also aware that wood has been suddenly ejected from a close vessel, wherein it had been subjected to heat and pressure for the purpose of disintegrating its fibers, and, therefore I do not claim that part of my process broadly.

What I claim as new, and desire to secure by Letters Patent, is—

In mashing, the process of producing complete disintegration of the grain, which consists in subjecting the grain to heat, moisture, and pressure in a close vessel under a stirring operation, and then suddenly discharging the grain from such vessel, whereby an abrupt relief of pressure will cause the disintegration, as set forth.

LEWIS J. COX.

Witnesses:
F. B. COOKERLY,
JOHN T. SCOTT.